US00RE35907E

United States Patent [19]

Obrecht

[11] E Patent Number: Re. 35,907

[45] Reissued Date of Patent: Sep. 29, 1998

[54] ADJUSTABLE BASE ASSEMBLY

[75] Inventor: Robert E. Obrecht, Bloomfield Hills, Mich.

[73] Assignee: REO Hydraulic Pierce & Form, Inc. Detroit, Mich.

[21] Appl. No.: 622,244

[22] Filed: Mar. 25, 1996

Related U.S. Patent Documents

Reissue of:

[64] Patent No.: 5,427,349
Issued: Jun. 27, 1995
Appl. No.: 266,800
Filed: Jun. 27, 1994

U.S. Applications:

[63] Continuation of Ser. No. 867,482, Apr. 13, 1992, abandoned.

[51] Int. Cl.[6] ..... F16M 13/00; B66F 3/08

[52] U.S. Cl. ..... 248/657; 248/188.4; 248/419; 248/660; 248/669; 254/85; 254/104

[58] Field of Search ..... 248/419, 420, 248/424, 657, 660, 669; 254/13, 84, 85, 104, 424, DIG. 1, DIG. 2, DIG. 8, DIG. 9; 269/234, 241, 242

[56] References Cited

U.S. PATENT DOCUMENTS

| | | | |
|---|---|---|---|
| 194,582 | 8/1877 | Cole | 254/104 X |
| 401,368 | 4/1889 | Piper | 254/104 |
| 942,170 | 12/1909 | Dunlap | 254/85 |
| 1,131,018 | 3/1915 | Troutman | 254/85 |
| 1,337,065 | 4/1920 | Garcia | 254/85 |
| 1,794,798 | 3/1931 | Sarr | 254/104 |
| 2,034,076 | 3/1936 | Zahner | 254/104 X |
| 3,089,680 | 5/1963 | Deve | 254/85 |
| 3,390,862 | 7/1968 | Schrepfer | 254/104 |
| 4,524,630 | 6/1985 | Toth et al. | 254/104 X |
| 4,716,803 | 1/1988 | Waltonen | 83/529 |
| 4,763,550 | 8/1988 | Waltonen et al. | 83/191 |

FOREIGN PATENT DOCUMENTS

| | | | |
|---|---|---|---|
| 623819 | 9/1978 | U.S.S.R. | 254/104 |
| 1551408 | 8/1979 | United Kingdom | 254/104 |

*Primary Examiner*—Clark F. Dexter
*Attorney, Agent, or Firm*—Young & Basile, P.C.

[57] ABSTRACT

An adjustable base assembly for selectively adjusting the horizontal and vertical position of a fabricating tool such as a punch or metal forming tool. The apparatus includes a generally planar base and a carriage assembly positioned on the base. The carriage assembly includes a lower wedge plate assembly having an upper surface defining a pair of upwardly converging wedge faces, an upper wedge plate assembly having a lower surface defining a pair of downwardly converging wedge faces, a pair of wedge blocks each having converging upper and lower wedge faces for respective sliding engagement with one of the upwardly converging wedge faces and one of the downwardly covering wedge faces, and a vertical adjustment screw mounted on the lower wedge plate, passing through the wedge blocks, and including left and right threaded portions for respective threaded coaction with a left threaded bore in one of the wedge blocks and a right threaded bore in the other wedge block. Rotation of the screw moves the wedge blocks toward or away from each other to raise or lower the upper wedge plate relative to the lower wedge plate. The carriage is moved horizontally relative to the base plate by a horizontal adjustment screw passing through a threaded bore in the lower wedge plate with the horizontal movement of the carriage on the base plate being facilitated by linear roller bearings interposed between the base plate and the lower wedge plate.

11 Claims, 5 Drawing Sheets

FIG-3
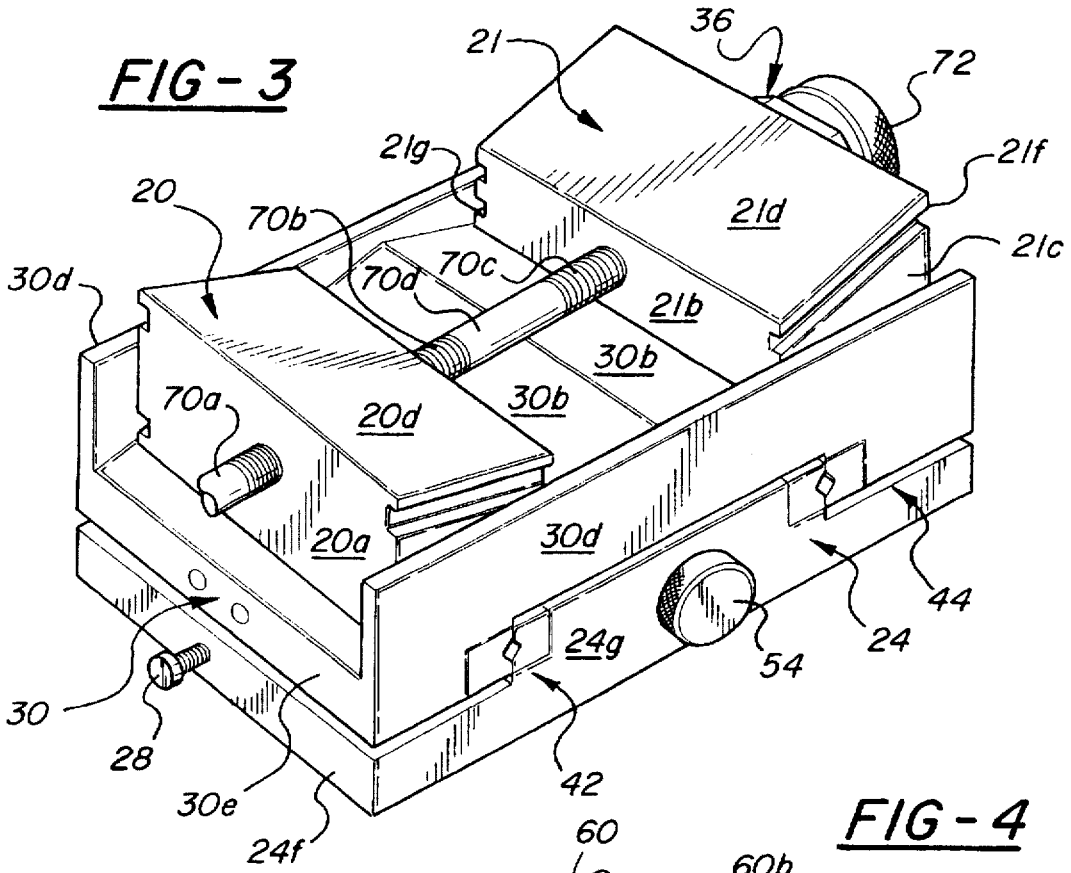
FIG-4
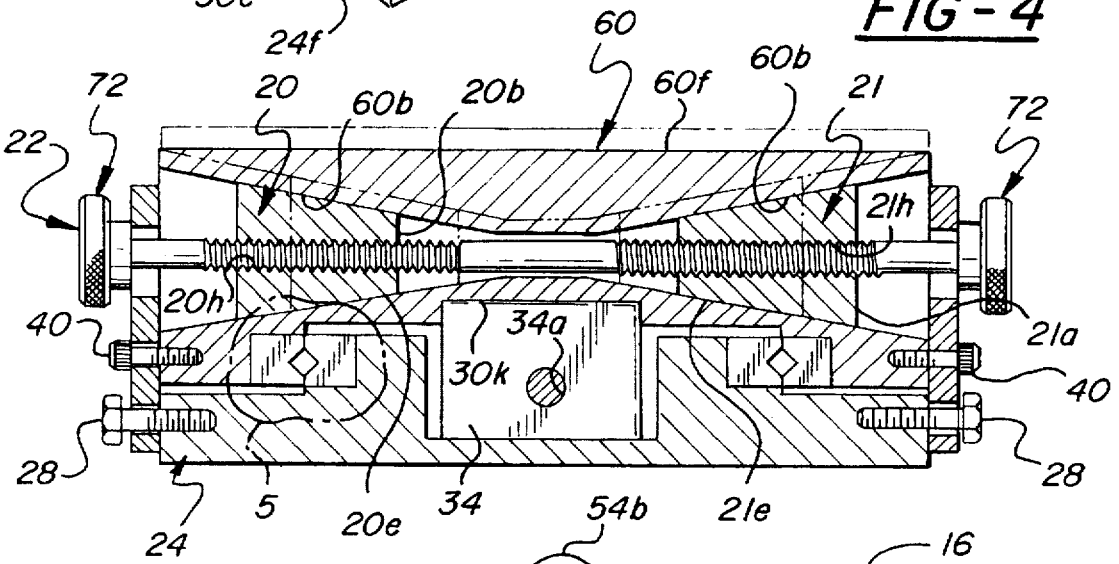
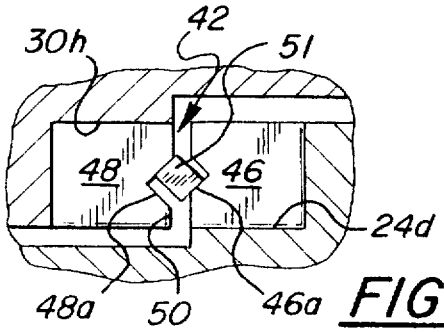
FIG-5
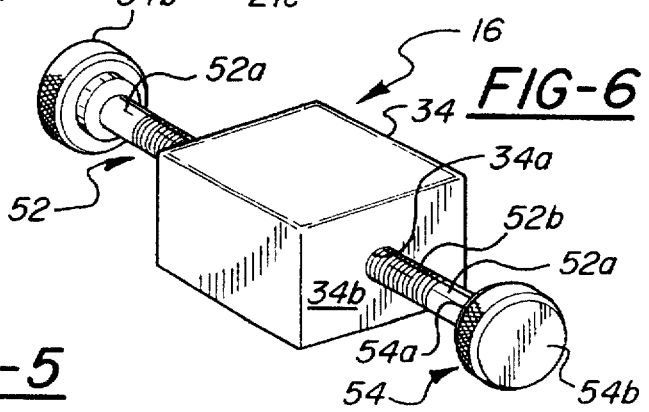
FIG-6

FIG-14
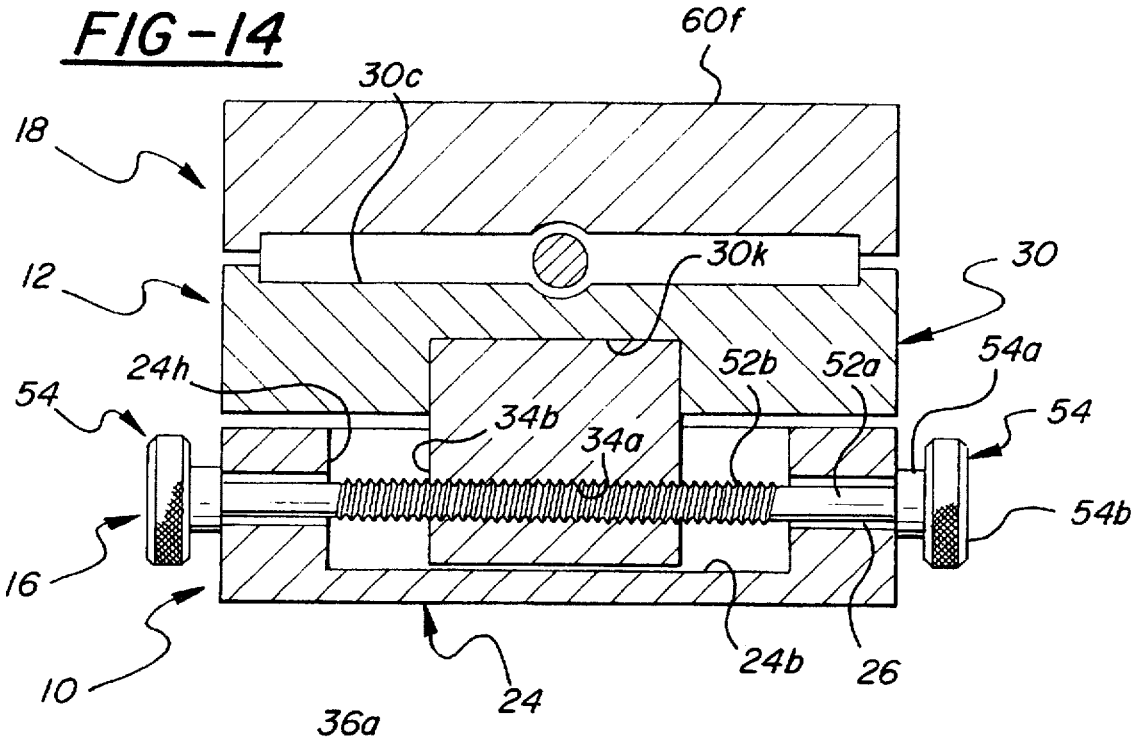
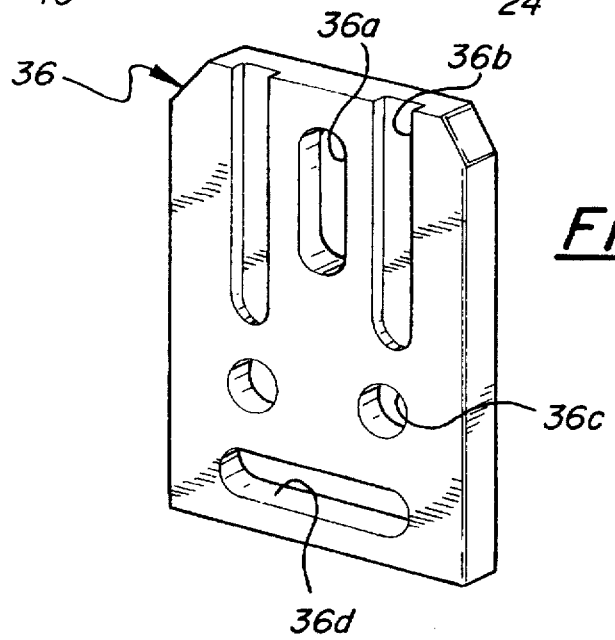
FIG-15
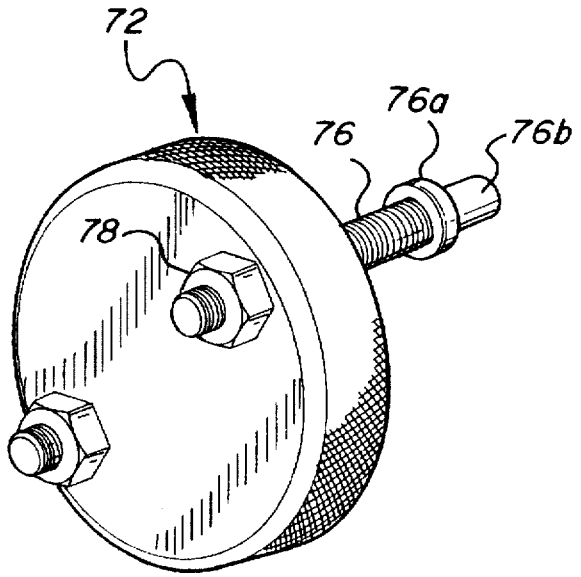
FIG-16

ADJUSTABLE BASE ASSEMBLY

Matter enclosed in heavy brackets [ ] appears in the original patent but forms no part of this reissue specification; matter printed in italics indicates the additions made by reissue.

This is a continuation of application Ser. No. 07/867,482 filed on Apr. 13, 1992, now abandoned.

BACKGROUND OF THE INVENTION

This invention relates to base assemblies for fabricating tools and more particularly to a base assembly that may be readily adjusted in a plurality of directions to selectively position the associated fabricating tool.

When utilizing fabricating tools such as punches or metal formers it is important that the tool be precisely positioned relative to the workpiece and it is often necessary to vary the positioning of the tool because of variations in the relative positions of the individual workpieces or because of variances in the dimensions of individual workpiece. This adjustment is typically performed by the use of shims or wedge pieces of varying thicknesses so that, by selecting the appropriate precise thickness of shim or wedge piece, the fabricating tool can be precisely positioned relative to the workpiece. Whereas this procedure results in accurate positioning of the fabricating apparatus relative to the workpiece, it is extremely time consuming and requires a rather high skill level on the part of the person making the adjustment.

SUMMARY OF THE INVENTION

This invention is directed to the provision of an adjustable base assembly for readily adjusting the position of a fabricating tool relative to a workpiece.

More specifically, this invention is directed to the provision of an adjustable base assembly which may be readily adjusted in a plurality of directions to readily adjust the position of the associated fabricating tool.

The invention adjustable base assembly includes a generally planar base and a carriage assembly positioned on the base. The carriage assembly includes a lower wedge plate assembly having an upper surface defining a pair of upwardly converging wedge faces; an upper wedge plate assembly having a lower surface defining a pair of downwardly converging wedge surfaces; a pair of wedge blocks each having converging upper and lower wedge faces for respective sliding engagement with one of the upwardly converging wedge faces and one of the downwardly converging wedge faces; means defining a left threaded bore in one of the wedge blocks, means defining a right threaded bore in the other of the wedge blocks; a vertical adjustment screw mounted on the lower wedge plate assembly, passing through the bores, and having left and right threaded portions for respective threaded engagement with the left and right threaded bores; and means precluding axial movement of the screw relative to the lower wedge plate assembly so that rotation of the screw moves the wedge blocks toward and away from each other to raise or lower the upper wedge plate assembly relative to the lower wedge plate assembly. The carriage is mounted on the base for horizontal movement in a direction generally transverse to the axis of the vertical adjustment screw so that the upper wedge plate assembly may be adjusted vertically by rotation of the vertical adjustment screw and may be adjusted horizontally by movement of the carriage on the base.

According to a further feature of the invention, the means mounting the carriage on the base comprises a threaded bore in the lower wedge plate assembly generally transverse to the axis of the vertical adjustment screw, a horizontal adjustment screw threadably engaging the lower wedge plate assembly bore, and means precluding axial movement of the horizontal adjustment screw relative to the base so that rotation of the horizontal adjustment screw moves the carriage horizontally on the base in a direction generally transverse to the axis of the vertical adjustment screw. This arrangement provides fine adjustment of the carriage horizontally with respect to the base.

According to a further feature of the invention, the mounting means further includes means defining transverse confronting surfaces on the base and on the lower wedge plate assembly and bearing means interposed between the confronting surfaces. This arrangement provides ease of movement of the carriage on the base.

According to a further feature of the invention, the bearing means includes a pair of linear roller bearings disposed one on each side of the horizontal adjustment screw. This specific bearing arrangement further facilitates the easy horizontal movement of the carriage on the base.

According to a further feature of the invention, the base assembly further includes a knob secured to each end of the vertical adjustment screw and a knob secured to each end of the horizontal adjustment screw. With this arrangement, the screws may be manually rotated to raise and lower the upper wedge plate assembly and move the carriage horizontally on the base so as to manually achieve a fine precision vertical adjustment and a fine precision horizontal adjustment.

BRIEF DESCRIPTION OF THE DRAWINGS

FIG. 3 is a perspective view of the invention base assembly with certain elements removed for clarity;

FIG. 4 is a cross-sectional view taken on line 4—4 of FIG. 1;

FIG. 5 is a detail view taken within the circle 5 of FIG. 4;

FIG. 6 is a perspective view of a thread block and adjuster screw subassembly employed in the invention base assembly;

FIG. 14 is a cross-sectional view taken on line 14—14 of FIG. 1;

FIG. 15 is a perspective view of an end bracket employed in the invention base assembly; and FIG. 16 is a perspective view of a knob assembly utilized in the invention base assembly.

DETAILED DESCRIPTION OF THE PREFERRED EMBODIMENT

Figure 1:
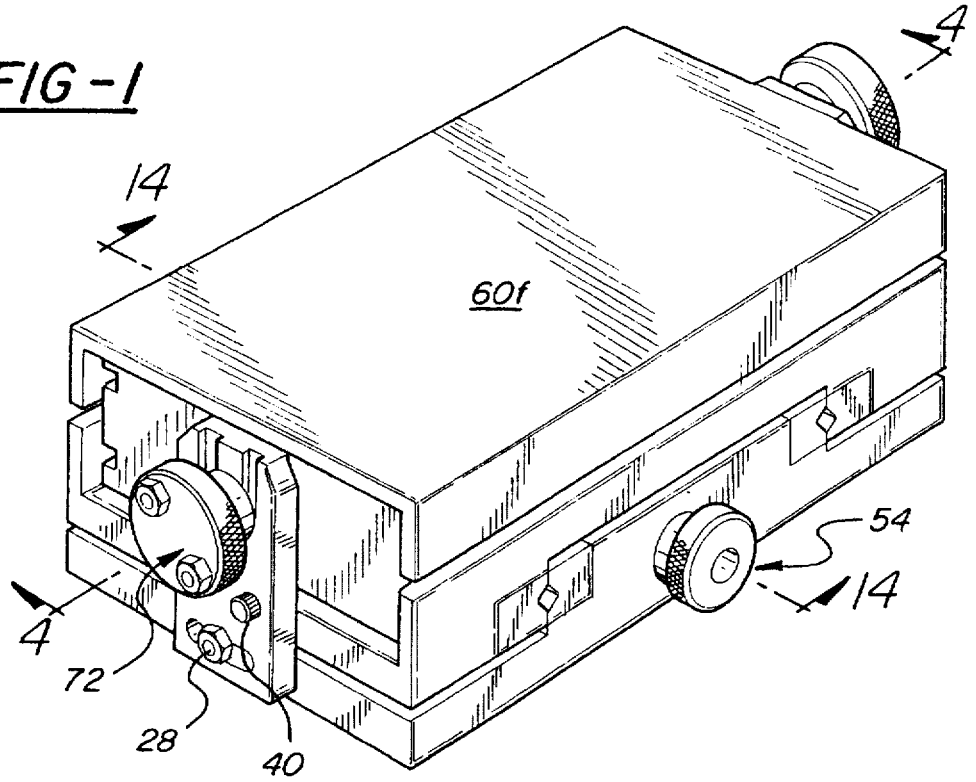
FIG. 1 is a perspective view of an adjustable base assembly according to the invention.

The invention adjustable base assembly, broadly considered, includes a base assembly 10, a lower wedge plate assembly 12, bearing means in the form of a pair of linear assemblies 42 and 44; a horizontal adjustment screw assembly 16, an upper wedge plate assembly 18, a pair of wedge blocks 20,21, and a vertical adjustment screw assembly 22.

All of the element of the invention base assembly, unless otherwise indicated, are formed of a suitable steel material.

Base assembly 10 includes a base plate 24, bushings 26, and lock screws 28.

Base plate 24 is generally rectangular and includes a raised central main body portion 24a defining a central, rectangular upwardly opening recess or pocket 24b, end portions 24c on opposite sides of raised main body portion 24a, transverse ledges 24d defined at opposite sides of the main body portion and raised slightly from the level of end portions 24c, and aligned transverse bores 24e extending through main body portion 24a and opening in recess 24b. Bushings 26 are formed of a suitable bronze material and are positioned in respective bores 24e. Lock screws 28 are threadably and centrally received in the opposite end edge faces 24f of the base plate.

Lower wedge plate assembly 12 includes a lower wedge plate 30, keys 32, a thread block 34, and end brackets 36.

Lower wedge plate 30 includes an upper surface 30a defining a pair of upwardly converging wedge faces 30b converging at apex 30c; upstanding side skirt portions 30d; end faces 30e; a central cut-out 30f opening in the lower face 30g of the plate; a pair of transverse ledges 30h on opposite sides of the cut-out 30f; a plurality of keyways 30i formed in the inner face of each skirt 30d proximate each wedge face 30b and extending parallel in each case to the associated wedge face; and a central arcuate cut-out 30j formed on the longitudinal centerline of the plate at the apex 30c.

Keys 32 are sized to fit snugly within keyways 30i and are suitably secured as by fasteners within the respective keyways.

Thread block 34 has a rectangular, monolithic configuration and is positioned in a recess or pocket 30k formed in the undersurface of lower wedge plate 30 within cut-out 30f. Thread block 34 includes a threaded transverse through bore 34a and is suitably secured to wedge plate 30 as by fasteners or the like.

Each end bracket 36 has an upstanding plate configuration and includes a central vertical through slot 36a, a vertical guideway 36b on each side of slot 36a, a pair of mounting holes 36c positioned respectively below guideways 36b, and a horizontal through slot 36d proximate the lower end of the bracket. Each end bracket 36 is secured to a respective end face 30e of the lower wedge plate 30 with screws 40 passing through holes 36c for threaded engagement with threaded bores 30c in the respective end face 30e to mount each bracket in upstanding fashion on a respective end of the lower wedge plate.

Each bearing 42,44 assembly comprises a way 46 secured to a ledge 24d of base plate 24 as by fasteners or the like, a way 48 secured to a ledge 30h of lower wedge plate 30 as by fasteners or the like, a cage 50 interposed between the ways, and a plurality of cylindrical rollers 51 riding in confronting grooves 46a,48a defined at the confronting faces of the ways 46,48 so as to mount the lower wedge plate assembly 30 for horizontal sliding movement on the base plate 24 in a direction generally transverse to the longitudinal centerline of the base plate with the thread block 34 slidably positioned within recess 24b of the base plate.

Horizontal adjustment screw assembly 16 includes a screw 52 and a pair of knobs 54 fixedly secured to the opposite ends of the screw. Screw 52 includes smooth shank portions 52a proximate each end of the screw journalled in respective bushings 26, and a threaded central portion 52b passing through threaded transverse bore 34a of wedge block 34.

Each knob 54 includes a hub portion 54a fixedly secured to a respective end of the screw and a knob portion 54b for grasping by the user. Each hub portion 54a is positioned flush against the respective side face 24g of the base plate so as to preclude the screw from axial movement relative to the base plate so that rotation of the screw 52 by suitable manipulation of either or both of the knobs 54 results in transverse movement of the thread block 34, and thereby the lower wedge plate assembly 12, relative to the base plate with the extent of transverse movement of the wedge plate assembly relative to the base plate being delimited and determined by engagement of the respective side faces 34b of the thread block with the respective side surfaces 24h of the recess 24b in the base plate.

Upper wedge plate assembly 18 includes an upper wedge plate 60 and a plurality of keys 62.

Upper wedge plate 60 includes a lower surface 60a defining a pair of downwardly converging wedge faces 60b converging at an apex 60c; skirt portions 60d at either side of lower surface 60a; end edges 60e; an upper platform surface 60f; a plurality of keyways 60g provided on the inner face 60h of each skirt portion 60d in association with each downwardly converging face 60b and extending parallel to the respective downwardly converging face 60b; and a central arcuate cutout 60h formed on the longitudinal center line of the plate at the apex 60c. Keys 62 are sized to fit in keyways 60g and are suitably secured within the keyways as for example by fasteners.

Each wedge block 20,21 includes a relatively large vertical end face 20a,21a, a relatively small vertical end face 20b,21b, side faces 20c,21c, and converging upper and lower wedge faces 20d,21d, and 20e,21e. Wedge faces 20d,21d and 20e,21e are inclined from the horizontal at an angle equal to the angle of inclination of the wedge faces 30b and 60b of the lower and upper wedge plates. An upper groove 20f,21f is provided on each side face 20c,21c proximate to and extending parallel to upper wedge face 20d,21d, and a lower groove 20g,21g is provided on each side face 20c,21c proximate to and extending parallel to lower wedge face 20e,21e. Grooves 20f,21f and 20g,21g are sized to slidably receive keys 62 and 32 respectively.

Wedge block 20 includes a through longitudinal left threaded bore 20h and wedge block 21 includes a through longitudinal right threaded bore 21h.

Wedge blocks 20,21 have a width corresponding to the distance between the inner faces of skirts 30d and skirts 60d so that the wedge blocks fit snugly between the skirts 30d and 60d.

Vertical adjustment screw assembly 22 includes a screw 70 and a pair of knobs 72.

Screw 70 includes smooth end portions 70a, a left threaded portion 70b, a right threaded portion 70c, and a smooth portion 70d intermediate the left and right threaded portions.

Each knob 72 includes a hub portion 72a adapted to be fitted over a respective end 70a of screw 70 and fixedly secured thereto and a knob portion 72b. Each knob portion 72b includes a pair of diagonally opposed threaded bores 72c each threadably receiving a threaded stop rod 76. Each stop rod 76 is locked to the knob 72 by a nut 78 and includes a collar 76a and a smooth end portion 76b sized to fit slidably in a respective groove 36b in a respective end plate 36.

In the assembled relation of the parts, lower wedge plate 30 is positioned on base plate 24 with linear roller bearings 42 and 44 coacting to provide low resistance lateral horizontal movement of the lower wedge plate relative to the base plate in a direction generally transverse to the central axis of the base plate; horizontal adjustment screw 52 passes threadably through the threaded bore in thread block 34 with the hub portions 54a of the respective knobs 54 positioned flush against the respective side faces 24g of the base plate to preclude axial movement of the screw 52 relative to the base plate so that rotation of the screw 52 in response to manipulation of either or both of knobs 54 moves thread block 34 and thereby lower wedge plate 30 horizontally with respect to the base plate in a left or right direction depending upon the direction of rotation of the screw; wedge blocks 20 and 21 are positioned with their lower wedge faces 20e,21e in sliding engagement with a respective wedge face 30b of lower wedge plate 30 and with keys 32 slidably disposed in lower grooves 20g,21g; upper wedge plate 60 is positioned over the wedge blocks with the wedge faces 60b in respective sliding engagement with the upper wedge faces 20d,21d of the wedge blocks and with the keys 62 slidably received in the upper grooves 20f,21f of the wedge blocks; and vertical adjustment screw 70 passes through vertical slots 36a in the respective end plates 36 and through wedge blocks 20 and 21 with left-hand threaded portions 70b threadably engaging the left threaded bore 20h of wedge block 20 and the right threaded portion 70c engaging the right threaded bore 21h of wedge block 21 and the central portion 70d of the screw accommodated by the arcuate cutouts 30j and 60h in the lower and upper wedge plates.

Figure 2:
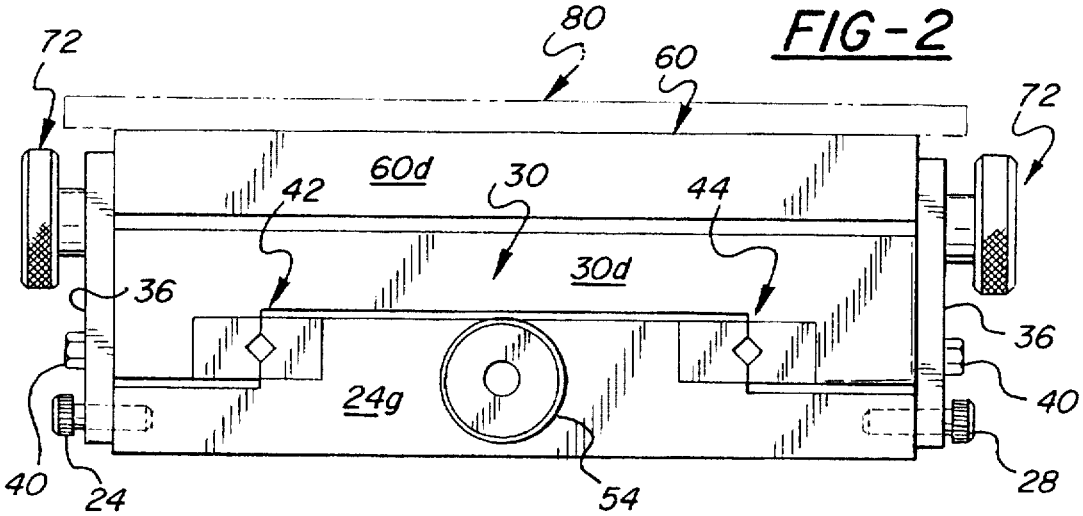
FIG. 2 is a side view of the invention base assembly.
Figure 13:
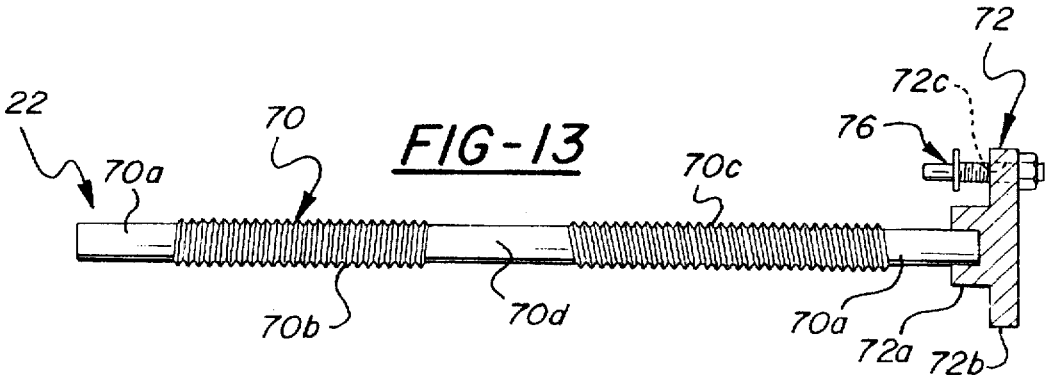
FIG. 13 is a view of a vertical adjustment screw utilized in the invention base assembly.
Figure 7:
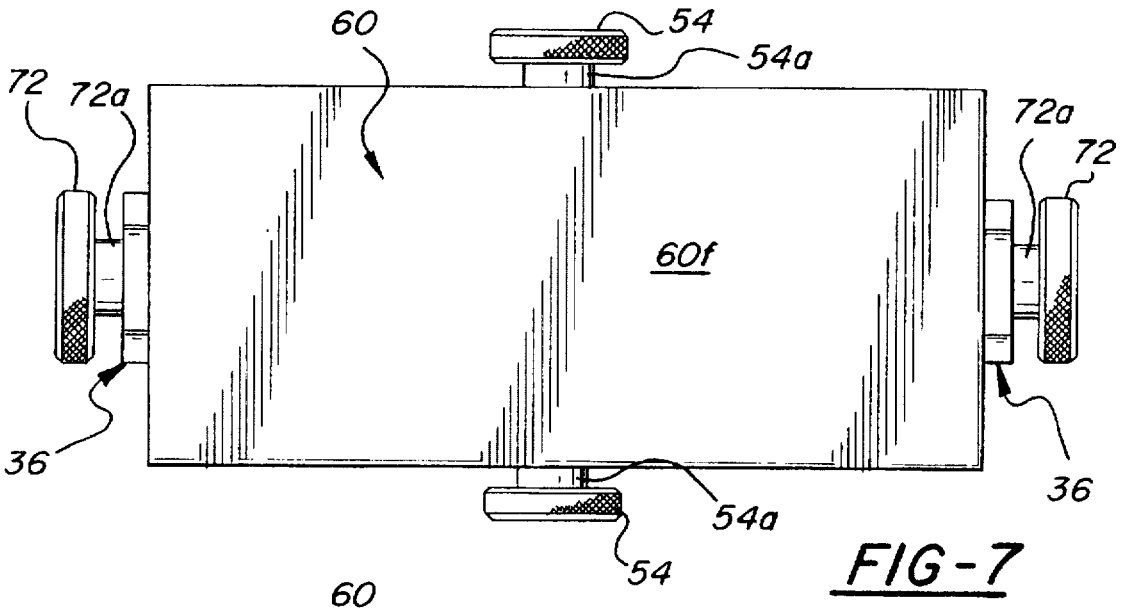
FIG. 7 is a top view of the invention base assembly.
Figure 8:
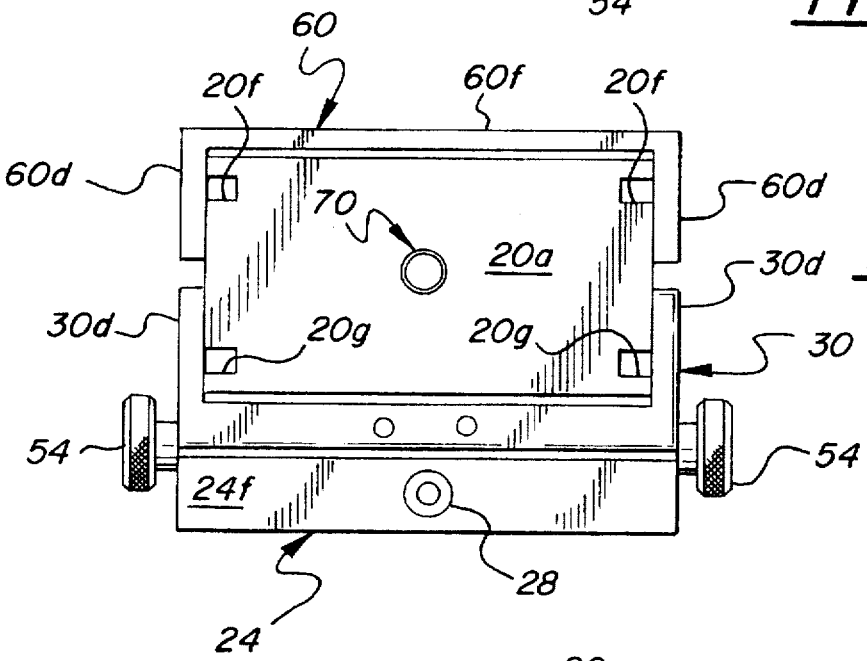
FIG. 8 is an end view of the invention base assembly.
Figure 9:
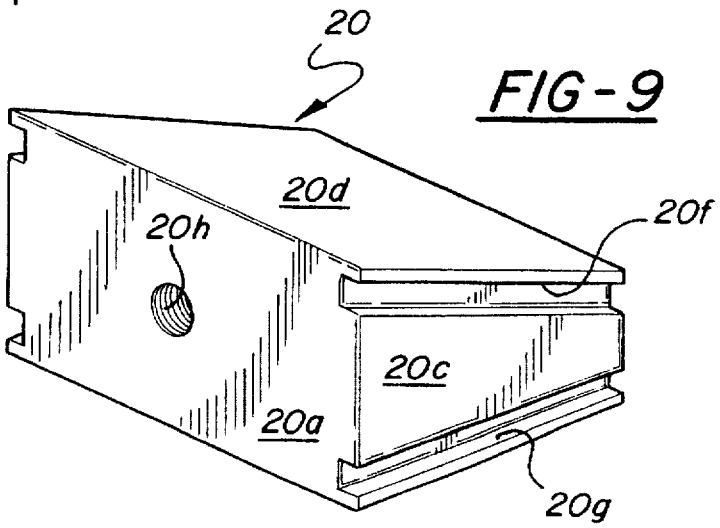
FIGS. 9, 10, 11 and 12 are perspective views respectively showing a wedge block, a base assembly, a lower wedge plate assembly, and an upper wedge plate assembly ( shown inverted) utilized in the invention base assembly.
Figure 10:
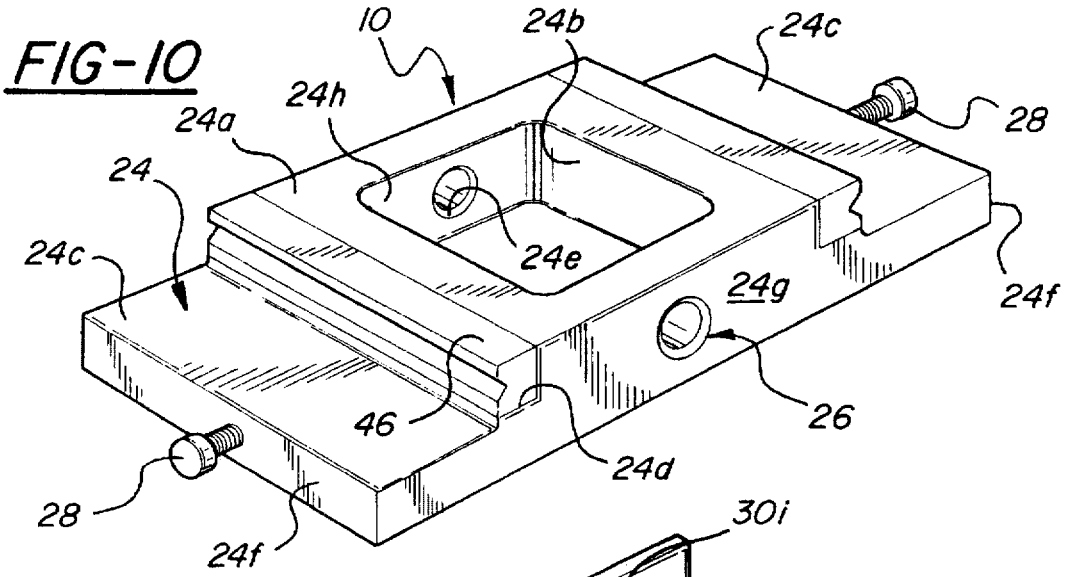
Figure 11:
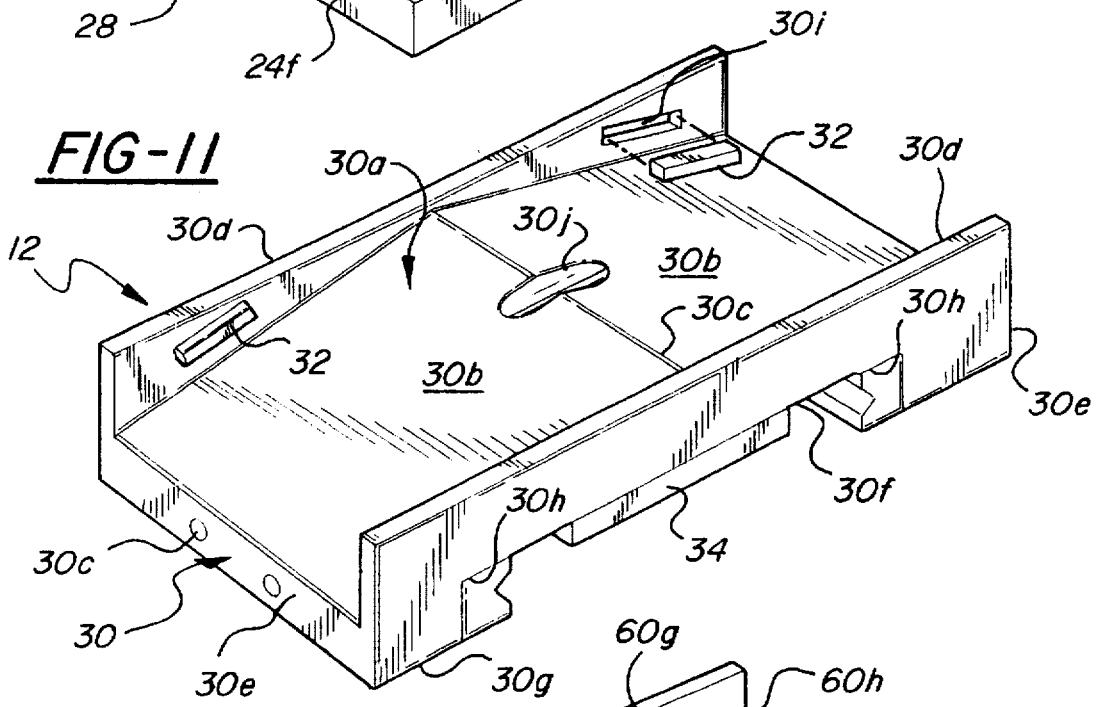
Figure 12:
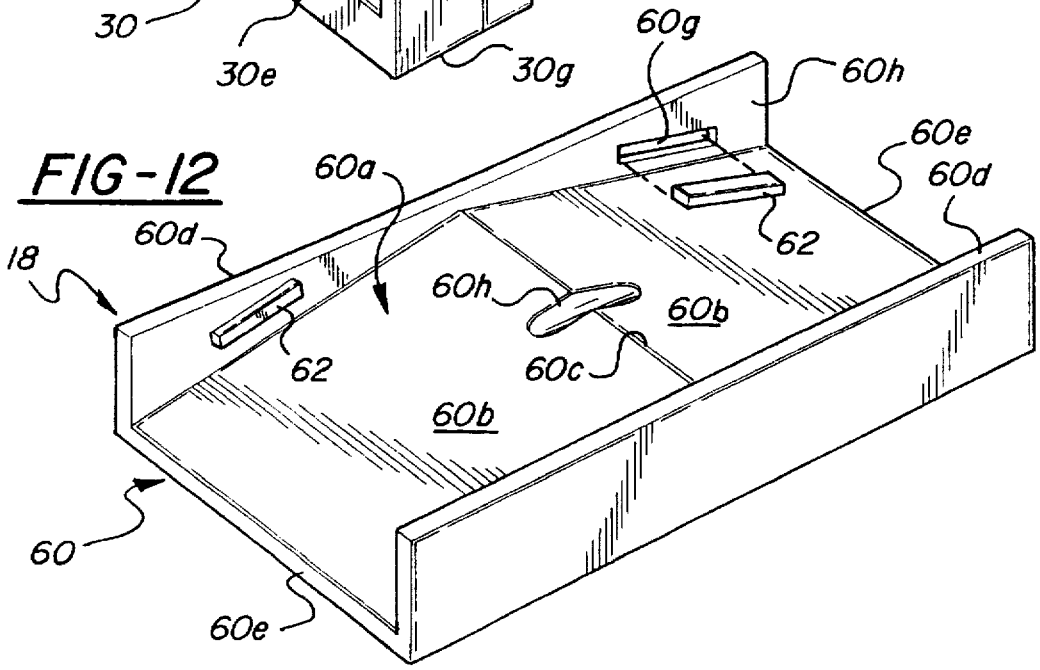

The upper wedge plate assembly, lower wedge plate assembly, and wedge blocks will be seen to constitute a carriage which may be moved selectively horizontally on the base plate 24 by-selective rotation of horizontal adjustment screw 52 by manipulation of either or both knobs 54 with the movement of the carriage on the base plate being facilitated by the low friction bearing interfaces provided by linear bearings 42 and 44. Further, the vertical position of upper wedge plate assembly 60 relative to the lower wedge plate assembly may be selectively adjusted by selective rotation of vertical adjustment screw 70 in response to manipulation of either or both knobs 72. As the screw 70 is rotated it will be seen that the wedge blocks 20 and 21 are moved toward each other or away from each other depending upon the direction of rotation of the screw, with movement of the wedge blocks toward each other resulting in raising of the platform surface 60f of the upper wedge plate and movement of the wedge blocks away from each other resulting ill lowering of the upper surface 60f of the upper wedge plate. It will be understood that, in use, a fabricating tool such as a punch or metal-forming tool is positioned on the platform surface 60f so that selective rotation of screws 52 and 70 selectively adjusts the horizontal and vertical position of the tool supported on the platform surface 60f. If desired, an adaptor plate 80, seen in dashed lines in FIG. 2, may be positioned on the upper wedge plate to provide a larger area platform for mounting of the associated fabricating tool.

Lock screws 28 are loosened prior to making a horizontal adjustment of the carriage relative to the base plate and are tightened following the adjustment to lock the carriage in its adjusted horizontal position and, similarly, stop bars 76 are threadably withdrawn from engagement with slots 36b in the end plates prior to making a vertical adjustment and the stop bars are threadably advanced following the adjustment to move the forward portions 76b of the stop bars back into coaction with slots 36b and thereby lock the assembly in its position of vertical adjustment.

The invention will be seen to provide a simple and effective assembly to readily and precisely adjust the position of an associated fabricating tool. Specifically, the coaction of the threads of the horizontal adjustment screw 52 with the threads of the thread block 34, in combination with the low friction bearing interfaces provided by the linear bearings 42,44 allows the carriage defined by the upper wedge plate assembly, lower wedge plate assembly, and wedge blocks to be moved easily and readily horizontally relative to the base plate in response to operator manipulation of knob 72, and the extremely large mechanical advantage provided by the combined screw coaction between the screw 70 and the wedge blocks and the wedge coaction between the upper and lower wedge faces of the wedge blocks and the wedge faces of the upper and lower wedge plates allows an extremely heavy fabricating tool to be readily adjusted vertically by manual manipulation of knobs 72.

Whereas a preferred embodiment of the invention has been illustrated and described in detail, it will be apparent that various changes may be made in the disclosed embodiment without departing from the scope or spirit of the invention.

I claim:

1. An adjustable base assembly comprising:

a generally planar horizontal base including end faces, a raised central portion between said end faces defining vertically oriented transversely extending surfaces facing outboard toward said end faces and positioned inboard of the respective end faces, and a pocket opening in the raised central portion;

a carriage positioned on the base and including:

a lower [wedge] plate [assembly] having end faces, an upper surface [defining a pair of upwardly converging wedge faces] *extending* between the end faces, *and* a lower surface defining vertically oriented transversely extending surfaces facing inboard and positioned inboard of the respective lower [wedge] plate [assembly] end faces and respectively confronting said transversely extending surfaces on the base[, and] ;

a threaded block extending downwardly from the lower surface of the lower [wedge] plate [assembly,] *and* including a transversely extending threaded through bore, [and] *said threaded block being* received in said pocket;

an upper [wedge] plate [assembly] having *end faces and* a lower surface [defining a pair of downwardly converging wedge faces] *extending between the upper plate end faces*;

*at least one of said lower plate and said upper plate being a wedge plate, said wedge plate comprising a pair of converging wedge surfaces between the respective end faces;* a pair of wedge blocks [each having] *positioned between and in sliding engagement with the upper and lower plates, said wedge blocks coacting to define a pair of* converging [upper and lower] wedge faces in respective sliding engagement with [one of] said [upwardly] *pair of* converging wedge [faces and one of said downwardly converging wedge faces] *surfaces*;

a left threaded bore in one of said wedge blocks[.] ;

a right threaded bore in the other of said wedge blocks[.] ;

a vertical adjustment screw passing through said wedge block bores and having left and right threaded portions in respective threaded engagement with said left and right threaded bores[.] ;

means mounting the opposite ends of said vertical adjustment screw on said lower [wedge]plate [assembly] and operative to preclude axial movement of said vertical adjustment screw relative to said lower [wedge] plate [assembly] so that rotation of said vertical adjustment screw moves said wedge blocks toward and away from each other to raise and lower the upper [wedge] plate [assembly] relative to the lower [wedge] plate [assembly];

a horizontal adjustment screw extending through side walls of said raised central base portion, into said pocket and through said threaded bore of said threaded block; and bearing means interposed between said confronting surfaces so that rotation of said horizontal adjustment screw moves said carriage transversely on said base.

2. The base assembly according to claim 1 wherein said bearing means includes at least one linear roller bearing disposed between said confronting surfaces.

3. The base assembly according to claim 2 wherein said base assembly further includes a knob secured to each end of said vertical adjustment screw and a knob secured to each end of said horizonal adjustment screw so that said screws may be manually rotated to raise and lower the upper [wedge] plate [assembly] and to move the carriage horizontally on the base respectively.

4. An adjustable base assembly comprising:

a lower [wedge] plate assembly having upwardly extending side walls and an upper surface [defining a pair of upwardly converging wedge faces] positioned between said side walls;

an upper [wedge] plate assembly having downwardly extending side walls and a lower surface [defining a pair of downwardly converging wedge faces] positioned between said side walls;

*at least one of said lower plate assembly and said upper plate assembly being a wedge plate, and wherein the corresponding one of said upper and lower surfaces comprises a pair of converging wedge surfaces between the respective sidewalls;* a pair of wedge blocks [each having converging upper] *positioned between* and [lower wedge faces] in [respective] sliding engagement with [one of said upwardly] *the upper and lower plate assemblies, said wedge blocks coacting to define a pair of* converging wedge faces [and one of said downwardly] *in respective sliding engagement with said pair of* converging wedge [faces] *surfaces*, and each *wedge block* having side faces in confronting relation to said upwardly extending side walls of said lower [wedge] plate assembly and said downwardly extending side walls of said upper [wedge] plate assembly;

a left threaded bore in one of said wedge blocks;

a right threaded bore in the other of said wedge blocks;

a vertical adjustment screw passing through said bores, and having left and right threaded portions respectively threadedly engaged with said left and right threaded bores;

coacting keys and grooves on the side faces of the wedge blocks and on the confronting side walls of the [wedge] plate assemblies; and means mounting the opposite ends of said vertical adjustment screw on said lower [wedge] plate assembly and operative to preclude axial movement of said vertical adjustment screw relative to said lower [wedge] plate assembly so that rotation of said vertical adjustment screw moves said wedge blocks toward and away from each other under the guidance of the coacting keys and grooves to raise and lower the upper [wedge] plate assembly relative to the lower [wedge] plate assembly.

5. The base assembly according to claim 4 further including a generally planar base and means for mounting the lower [wedge] plate assembly for horizontal movement on the base in a direction generally transverse to a longitudinal axis of the vertical adjustment screw.

6. The base assembly according to claim 5 wherein said mounting means comprises a threaded bore in said lower [wedge] plate assembly extending generally transverse to said longitudinal axis, a horizontal adjustment screw threadably engaging said lower [wedge] plate assembly bore, and means for precluding axial movement of said horizontal adjustment screw relative to said base so that rotation of said horizontal adjustment screw moves said lower [wedge] plate assembly horizontally on said base in a direction generally transverse to said longitudinal axis.

7. The base assembly according to claim 6 wherein said mounting means further includes at least one pair of transverse confronting surfaces, said pair including a transverse surface on said base confronting a transverse surface on said lower [wedge] plate assembly, and bearing means interposed between said pair of confronting surfaces.

8. The base assembly according to claim 7 wherein said bearing means includes at least one linear roller bearing, wherein there are two pars of said confronting surfaces, one pair along with one of said bearing means disposed on each side of said horizontal adjustment screw.

9. The base assembly according to claim 8 wherein said base assembly further includes a knob secured to each end of said vertical adjustment screw and a knob secured to each end of said horizontal adjustment screw so that said screws may be manually rotated to raise and lower the upper [wedge] plate assembly and to move the lower [wedge] plate assembly horizontally on the base respectively.

*10. The base assembly according to claim 1 wherein said one surface comprises said lower surface of said upper plate assembly.*

*11. The base assembly according to claim 4 wherein said one surface comprises said lower surface of said upper plate assembly.*

* * * * *